US010728954B2

(12) United States Patent
Dahan et al.

(10) Patent No.: US 10,728,954 B2
(45) Date of Patent: Jul. 28, 2020

(54) AUTOMATED NETWORK DESIGN AND TRAFFIC STEERING

(71) Applicant: AT&T INTELLECTUAL PROPERTY I, L.P., Atlanta, GA (US)

(72) Inventors: Joseph Dahan, Redmond, WA (US); Michal Cwian, Kirkland, WA (US); Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 21 days.

(21) Appl. No.: 16/057,294

(22) Filed: Aug. 7, 2018

(65) Prior Publication Data
US 2020/0053834 A1 Feb. 13, 2020

(51) Int. Cl.
*H04W 88/18* (2009.01)
*H04L 12/24* (2006.01)
(Continued)

(52) U.S. Cl.
CPC ......... *H04W 88/18* (2013.01); *H04L 41/0816* (2013.01); *H04L 41/16* (2013.01);
(Continued)

(58) Field of Classification Search
CPC .............................. H04W 48/18; H04L 47/78
See application file for complete search history.

(56) References Cited

U.S. PATENT DOCUMENTS 9,338,065 B2  5/2016  Vasseur et al.
9,491,678 B2  11/2016  Cui et al.
(Continued)

FOREIGN PATENT DOCUMENTS

CN   107016175 A    8/2017
WO   2014124671 A1  8/2014
(Continued)

OTHER PUBLICATIONS

Kulinski, et al. "Application of cognitive techniques to network management and control" EVOLVE—A Bridge between Probability, Set Oriented Numerics, and Evolutionary Computation V. Springer, Cham, 2014. 21 pages.
(Continued)

Primary Examiner — Marsha D Banks Harold
Assistant Examiner — Elton Williams
(74) Attorney, Agent, or Firm — Amin, Turocy & Watson, LLP

(57) ABSTRACT

Initiation of a network slice event is disclosed. The network slice event can be initiated in response to, and according to a determined a network slice event instruction. The network slice event can result in modification of network slices of a network. The modification of the network slices can correspond to a change in the performance of the network. The modification of the network slices can comprise adding a new slice, removing an existing slice, adapting an existing slice, etc. Artificial intelligence, machine learning, etc., can be employed to provide an inference related to determining the network slice event instruction. The slice event can be implemented via a network controller, for example an ONAP component, based on the network slice event instruction.

20 Claims, 10 Drawing Sheets

(51) Int. Cl.
*H04W 28/16* (2009.01)
*H04W 48/18* (2009.01)
*H04W 72/04* (2009.01)

(52) U.S. Cl.
CPC .......... *H04W 28/16* (2013.01); *H04W 48/18* (2013.01); *H04W 72/0453* (2013.01)

(56) References Cited

U.S. PATENT DOCUMENTS

| | | | |
|---|---|---|---|
| 9,591,536 | B2 | 3/2017 | Lei et al. |
| 9,872,210 | B2 | 1/2018 | Henderson et al. |
| 2011/0150470 | A1 | 6/2011 | Jenkins et al. |
| 2015/0117259 | A1 | 4/2015 | Xaypanya et al. |
| 2015/0363219 | A1 | 12/2015 | Kasturi et al. |
| 2016/0205697 | A1 | 7/2016 | Tan et al. |
| 2016/0239330 | A1 | 8/2016 | Mc Bride et al. |
| 2016/0352924 | A1* | 12/2016 | Senarath ........... H04M 15/8016 |
| 2017/0019302 | A1 | 1/2017 | Lapiotis et al. |
| 2017/0054641 | A1 | 2/2017 | Anerousis et al. |
| 2017/0078171 | A1 | 3/2017 | Tapia et al. |
| 2017/0085628 | A1 | 3/2017 | Mahindra et al. |
| 2017/0164349 | A1 | 6/2017 | Zhu et al. |
| 2018/0034921 | A1 | 2/2018 | Gopalan et al. |
| 2018/0124660 | A1* | 5/2018 | Zhang ................. H04W 36/22 |
| 2018/0302877 | A1* | 10/2018 | Bosch .................. H04W 68/02 |

FOREIGN PATENT DOCUMENTS

| | | |
|---|---|---|
| WO | 2016119822 A1 | 8/2016 |
| WO | 2016192746 A1 | 12/2016 |
| WO | 2017192791 A1 | 11/2017 |
| WO | 2017214932 A1 | 12/2017 |
| WO | 2018042232 A1 | 3/2018 |
| WO | 2018048769 A1 | 3/2018 |

OTHER PUBLICATIONS

Xu, et al. "CogNet: A network management architecture featuring cognitive capabilities" Networks and Communications (EuCNC), 2016 European Conference on. IEEE, 2016. 5 pages.

Bogale, et al. "Machine Intelligence Techniques for Next-Generation Context-Aware Wireless Networks" arXiv preprint arXiv:1801.04223 (2018). 10 pages.

Moysen, et al. "From 4g to 5g: Self-organized network management meets machine learning" arXiv preprint arXiv:1707.09300 (2018). 23 pages.

Kibria, et al. "Big data analytics, machine learning and artificial intelligence in next-generation wireless networks" arXiv preprint arXiv:1711.10089v3 (2018). 9 pages.

Imran, et al. "Challenges in 5G: how to empower SON with big data for enabling 5G" IEEE network 28.6 (2014): 8 pages.

* cited by examiner

AUTOMATED NETWORK DESIGN AND TRAFFIC STEERING

TECHNICAL FIELD

The disclosed subject matter relates to modifying a network slice and, more particularly, to automating design of a slice, initiation of a slice event, and subsequent employment of resulting network slice(s), based on a network analytic.

BACKGROUND

Next-generation mobility networks, including 5G cellular networks and systems, are anticipated to enable disruptive digital transformation in the society that will enable people, machines, businesses and governments with unprecedented capabilities to communicate and share information effectively. Beyond the cutting-edge radio access technologies, 5G aims to integrate cross-domain networks so that service providers can offer network-on-demand as a service. With the advances in 5G, new mobility services, convergence of fixed and rich mobile services across several industry verticals and new services-revenue-business models can be enabled. The demands on 5G can be high in terms of handling a variety of use cases associated with mobile-to-mobile and the 'internet of things' (M2M/IoT), augmented/virtual reality (AR/VR), telehealth, targeted mobile advertising, connected cars etc. These new services can require a wide range of aggregate bit rates, low latencies, vehicular speeds, device types and device capabilities, device densities, etc., to provide consistent end user quality for a given service in heterogeneous environment.

DETAILED DESCRIPTION

Figure 1:
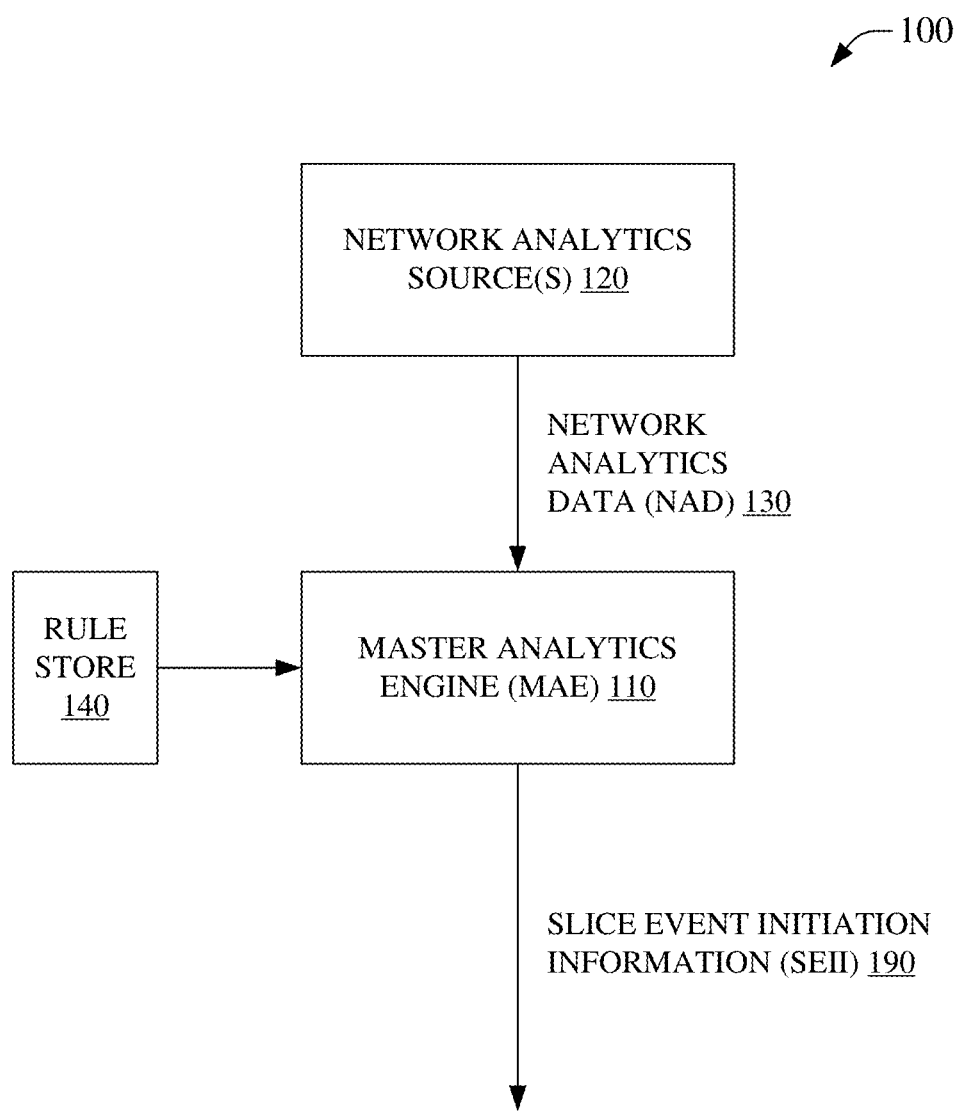
FIG. 1 is an illustration of an example system that can facilitate initiation of a network slice event, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, modern networks, e.g., 5G, 6G, etc., can be highly resource intensive in terms of handling mobile-to-mobile (M2M), 'internet of things' (IoT), augmented/virtual reality (AR/VR), telehealth, targeted mobile advertising, connected cars, and other applications/services/technologies. As such, modern networks can require a wide range of aggregate bit rates, targeted latencies, support for device types and device dependent capabilities, scalability for various device densities, etc., to provide consistent end user quality for a given use in a heterogeneous networking environment. Given that a centralized network architecture model with a single set of standard mobility network functions can be extremely complex and expensive to deploy in a manner that can be able to meet the demanding performance requirements for a wide variety of mobility services, network slicing concepts can enable use of standardized network elements and functions in a manner that can be dynamically re-configurable within a network operator architecture to be able to create and deliver a given mobility service. Logically slicing a core network into multiple virtual networks, hereinafter referred to as core network (CN) slice(s), can enable designation of and/or optimization of the CN slice to meet dynamically changing demands on the CN. Moreover, in addition to core network resources, slicing can be equally applicable to a radio access network (RAN) as well. Given the scarce physical radio resources of a RAN, and their allocations and utilizations in space, frequency and time domains, it can be possible to define end-to-end network slicing, wherein one or more CN slice(s) is intelligently paired with one of more RAN slice(s) to adaptively define an end-to-end network-on-demand for services employing differing application(s) and/or service(s), business agreement(s), etc. Hereinafter, a 'network slice' typically refers to a core network slice, a radio access network slice, another type of slice, or combinations thereof, unless otherwise expressly or inherently indicating otherwise.

In an aspect a RAN can comprise devices enabling an end device located at an edge of a network, e.g., a mobile device, user equipment (UE), IoT sensor, tablet computer, PC, etc., to connect to a network of a wireless network provider. In some embodiments, a RAN can comprise a wired connection, a wireless connection, or both. As an example, a RAN can comprise a NodeB or eNodeB enabling a user equipment (UE) to connect via a wireless link to a network of a wireless network provider. In another example, a RAN can comprise a femtocell, picocell, etc., that can provide a wireless link to the example network. In an aspect, a RAN component can provide one or more RAN technologies, for example, a router can provide a wired link, a WiFi link, e.g., an IEEE 802.xx connection, etc., a Bluetooth® link, a cellular link, etc. These links, portions thereof, combinations thereof, etc., can act as one or more RAN slices.

Generally speaking, a slice can be a virtualization of a physical network that enables independent architecture, partitioning, and organization of computing resources in each slice. This can facilitate flexibility that is typically not readily available in a monolithic embodiment of a physical network. A physical RAN can be sliced in to virtual RAN slices such that the one or more virtual RAN slices can each be adapted according to corresponding characteristics, e.g., adapted to perform a specific type of communication or service better than a generic channel of the monolithic physical RAN. Similarly a CN slice can also be a virtualization of a physical CN resource. Typically a slice, e.g., either a RAN or CN slice, can be considered self-contained with regard to operation, traffic flow, performance, etc., can have its own virtualized architecture and features, and can be individually provisioned in a network. The virtualization of physical network resources via slicing can simplify creation, management, and operation of slices, typically tailored to a type of functionality, environment, service, hardware, etc., to enable efficient consumption of network resources of the physical network. As examples, a first slice can have a first bandwidth and a second slice can have a different second bandwidth; a first slice can have a different latency than a second slice; a first slice can employ different virtual functions, e.g., VNFs, than a second slice; etc. As disclosed herein, selection of a RAN slice and/or a CN slice can provide benefit to a network by efficiently employing the resources of the end-to-end network, such as by pairing a narrow spectral RAN slice with a CN slice that supports IoT devices via VNFs frequently employed by an IoT device, which can be more efficient than pairing a wide spectral RAN slice with the same CN slice, where this can waste the extra spectrum allocated via the wide spectral RAN slice. Other more nuanced examples are readily appreciated and considered within the scope of the presently disclosed subject matter even where not explicitly recited.

Pairing or binding can adaptively employ a RAN slice(s), a CN slice(s), or a combination of slice(s) to provide desired or indicated features, performance, cost, efficiency, etc. Moreover, in contrast to random pairing between RAN and Core slices, e.g., based on pre-defined static allocations, intelligent pairing can allocate a resource(s) in real time or near real time, and in a manner that can reflect business goals. Lack of an intelligent pairing function for RAN and core slices, and real-time sharing of such information to a network slice coordinator, can impact network functionality as well as targeted mobility applications and services. End-to-end network slicing can be referred to as 'network slicing' and a network slice can comprise either or both a RAN slice(s) and a CN slice(s), as distinct from CN slicing that does not consider a RAN slice, and as distinct from RAN slicing that does not consider a CN slice.

Network slicing can transform a monolithic mobility networking architecture that has traditionally been used to service smartphones in the current wireless network provider industry. With the proliferation of new wireless technologies and next generation mobile devices, the connectivity and communication models can be expected to rapidly evolve and drive the adoption of new services which were not possible before. Moreover, as network functions transform from physical to virtual domain, e.g., in a cloud centric environment, etc., this transformation can open up innovative opportunities to be able to design fully programmable mobile networks, for example, network that can deliver a 'micro-service architecture', etc. Programmable or adaptive network technology concepts can be applied to core networks and can extended to radio access networks, to provide radio resources and create a robust network slicing concept that can work in a coordinated manner.

Under network slicing technologies, within a single frequency band for a RAN device, each carrier can be split into one or more slice(s) that can be selectable in terms of their utilization in space, time, frequency domain, etc. Each such slice, and combinations of such slices, can be employed within a single carrier-band and/or across multiple carriers for different sets of services, e.g., based on device requirements in a real-time or near real-time manner. Thus, dynamic spectrum management, for example as disclosed herein, can enable spectral allocation via configurable network slices, e.g., pairing of a RAN slice and CN slice, adaptation of a RAN/CN slice pair, etc., in one or more region(s). Spectrum slicing granularity available within a RAN can enable allocation of a fine RAN slice to provide service to applications/services of one or more device across one or more groups of devices, with similar or identical characteristics, for example, narrow band IoT devices that can operate in a 200 kHz channel for infrequent and short data transmission can employ a RAN slice that is narrow and temporally multiplexed to serve the one or more IOT devices, which can also be performed across one or more geographic regions. The example IOT devices can be devices such as, but not limited to, sensors, utility meters that can wake up to report their readings and then return to an extended sleep mode, parking meters that report upon use then return to a sleep mode, etc.

Moreover, the example RAN slice can be re-allocated, for example, as a standalone resource, etc., combined with other radio slices per appropriate rules for aggregation, etc., to satisfy changing service conditions/requirements, e.g., where the RAN slice can be subsequently used to provide service to other devices including mobile broadband smartphones, more spectrum demanding classes of IoT devices, etc. The RAN slice allocation can adapt in real-time, or near real-time, and can maintain a record of historical RAN slice allocation(s), pairing(s), etc., to facilitate future use by the example less demanding IoT devices as they are deployed, though subject to prompt adaptation based on current spectral/performance demands. As such, analysis of information pertaining to the device/service using the spectrum, in addition to analysis of the RAN slice and/or CN slice, can therefore enable intelligent use of historical information to facilitate allocation of a network slice, which can then be adapted based on the demands/performance in the present use of the network slice. In an embodiment, the analysis can be performed based on the historical information and current use prior to allocation of the network slice, e.g., RAN slice-CN slice pair. In an embodiment, the historical information can be employed to select an initial network slice that can then subsequently be adapted based on the current use. Adaptation of a network slice can comprise adaptation of the RAN slice, adaptation of the CN slice, or both. Moreover, the adaptation can be used to update stored historical data. Adaptation of the RAN slice can include changes to the time, frequency, space, etc., of the RAN slice, merging RAN slices, divesting RAN slices, ranking RAN slices, ordering RAN slices, shifting a RAN slice in frequency, time, space, etc., coordinated use with another RAN slice, etc. Adaptation of the CN slice can merge CN slices, divest CN slices, rank CN slices, order CN slices, coordinate use with another CN slice, add/remove functionality to a CN slice, e.g., adding/removing one or more virtual network function (VNF) to a CN slice, etc. Adapting a RAN slice or CN slice can be performed in an automated manner, e.g., in a software deployed network (SDN), via network function virtualization (NFV), etc. As an example, intelligent selection of a network pair can result in offloading non-critical traffic from a RAN slice, CN slice, RAN slice group, CN slice group, etc., to a different RAN or CN slice based on, for example, the priority of the services in a given location, a subscriber agreement parameter, historical use by the device requesting access to a service via the network pair, planned/unplanned maintenance of a RAN device or CN device, changes in use of RAN resources, availability of alternate VNFs, etc.

In an aspect, a component facilitating communication between an UE and another device via a network can provide network analytics data (NAD). NAD can represent performance of a portion of a communication framework from the UE to the other device, e.g., RAN device performance, core network device performance, etc. In an aspect, the performance can be considered a network state. Moreover, where there are different network states, each state can represent a corresponding performance or group of performances related to the performance of portions of the network for the given network state. The term 'state' can generally be interchanged with the term 'performance' or 'characteristic' without departing from the scope of the presently disclosed subject matter. Whereas NAD can be generated by a variety of devices in the communication path, coordination of the NAD from the corresponding network analytics source(s) can provide an opportunity to improve management of network slice(s), e.g., via initiation of a slice event that can modify the network slice(s), such as adding a new network slice, removing an existing network slice, altering a performance of a network slice, modifying trigger conditions for deploying additional an network slice, etc. Furthermore, artificial intelligence and/or machine learning (AI/ML) can be employed to facilitate automation of slice event(s) and utilization of resulting network slices. Further, use of network automation platform components can enable design/provisioning/deployment of slices in accord with inferences formed from coordinated analysis of NAD from one or more network analytics source. The inference can be constrained by rules, training sets, etc., that can be provided to enable the AI/ML to better meet user expectations for a given network and given conditions of the network.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate initiation of a network slice event, in accordance with aspects of the subject disclosure. System 100 can comprise master analytics engine (MAE) 110. MAE 110 can receive network analytics data (NAD) 130 from a network analytics source(s) 120. Network analytics source(s) 120 can provide analytics data from various portions of a network, e.g., from a radio access network (RAN) portion of the network, from a core network portion of the network, from a transport layer portion of the network, from an applications/services portion of the network, etc. As an example, a car manufacturer can launch self-driving trucks that can transport goods along a transportation corridor. The car manufacturer can work with a network provider to dedicate a first network slice for self-driving truck traffic in order to provide edge connectivity for the self-driving trucks that achieves low latency and high throughput that would be beneficial to the self-driving aspect of the trucks. As the self-driving trucks become increasingly more popular, additional transportation corridors can start to see increasing use. Data can be collected from various data sources that illustrate where some adjustment can be made in the network slices that include the first network slice. These data sources can correspond to different portions of the network, e.g., a RAN analytics engine can provide first NAD related to mobility patterns evolution for the self-driving trucks to use more than the transportation corridor for which the first slice was designed; a transport analytics engine: can indicate that some trucks can be experiencing higher latency on the routes outside of the original transportation corridor; a core analytics engine can indicate that an 'edge core' is becoming increasingly inefficient in serving self-driving truck traffic, e.g., due to trucks using more distant transportation corridors, increased network traffic density as the number of self-driving trucks in a region increases, etc.; an application analytics engine can illustrate traffic patterns for self-driving trucks are increasingly augmenting, e.g., application alarm(s) can indicate that requests are timing out due to higher latency, putting the truck traffic at risk, etc. MAE 110 can coordinate NAD 130 to enable modification of network slices.

MAE 110 can access or receive a rule via rule store 140. A rule can be employed to respond to the coordinated analysis of NAD 130 by MAE 110. As an example, determining that a rule related to an amount of traffic on a slice is satisfied can result in MAE 110 generating an instruction related to provisioning an additional slice to carry some of the traffic, carry new traffic, etc. As another example, determining that a rule related to quality of service (QoS) is satisfied can result in MAE 110 generating an instruction related to altering a bandwidth of a network slice to alter the QoS level of the network slice. Numerous other examples are to be appreciated by one of skill in the art and all such examples are within the scope of the present disclosure despite not being enumerated for the sake of clarity and brevity.

MAE 110 can enable access to slice event initiation information (SEII) 190. SEII 190 can result in modification of network slices. In some embodiments, SEII 190 can be generated by MAE 110 based on NAD 130 and/or a rule from rule store 140. Continuing the earlier self-driving truck example, a master analytics engine, e.g., MAE 110, can compile information received from the other analytics sources, e.g., NAD 130 from network analytics source(s) 120. MAE 110 can identify, for example, that new trucks have been deployed in large numbers and are these new trucks can now be employing additional transportation corridors other than the originally planned for transportation corridor. A new slice can be deployed in response to MAE 110 facilitating access to slice event initiation information, e.g., SEII 190, etc. The new slice can employ network resources closer to the new transportation corridor routes used by the additional self-driving trucks that have been deployed. As still further self-driving trucks are deployed, they can be placed on the new slice. Further, as the use of the network slices continues to evolve, MAE 110 can continue to respond to changes by modifying network slices based on coordinated analysis of NAD from the various parts of the network.

Figure 2:
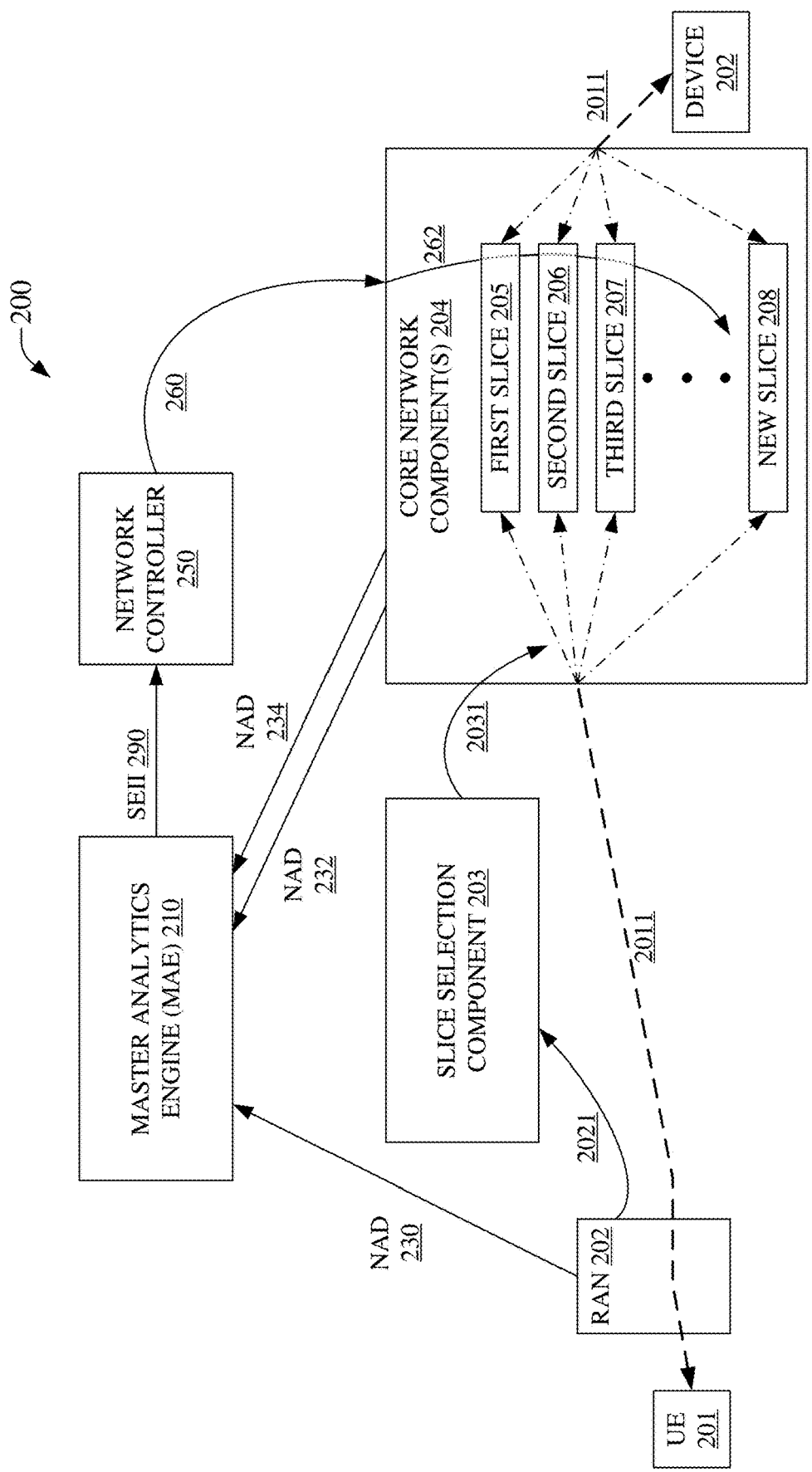
FIG. 2 is an illustration of an example system that can facilitate modification of network slices based on coordinated analysis of network analytic data for a plurality of network components, in accordance with aspects of the subject disclosure.

FIG. 2 is an illustration of a system 200, which can enable modification of network slices based on coordinated analysis of network analytic data for a plurality of network components, in accordance with aspects of the subject disclosure. System 200 can comprise MAE 210, which can receive NAD, e.g., NAD 230, 232, 234, etc., from network analytics source(s), e.g., RAN 202, core network component(s) 204, etc. MAE 210 can analyze the received NAD(s) and enable access to SEII 290. SEII 290 can result in modification of network slices.

SEII 190 can be received by network controller 250. In an embodiment, network controller 250 can comprise a network automation platform component such as an open network automation platform (ONAP) component. As such, network controller 250 can enable core network component(s) 204 to receive controller information 260 that can facilitate a slice event initiation via instructions 262 that can result in modification of network slices, e.g., first slice 205, second slice 206, third slice 207, etc., for example, creation of new slice 208, deletion of a slice (not illustrated), adaptation of a slice (not illustrated), etc.

In an aspect, the modification of the network slices via MAE 210 can result in communications between UE 201 and device 202 to employ the same or a different slice, e.g., the communication path 2011 can pass between UE 201 and device 202 via RAN 202 and core network component(s) 204, e.g., via one or more of slice(s) 205-208. In an embodiment, RAN 202 can communicate slice selection information 2021 to slice selection component 203, and slice selection component 203 can indicate, via selected slice information 2031, which CN slice to employ. Moreover, although not illustrated for clarity and brevity, a RAN slice can also be modified via receiving controller information 260. RAN 202 can receive controller information 260 directly from network controller 250, indirectly via core network component 204, etc. In some embodiments, network controller 250 and slice selection component 203 can be embodied in the same component or device, or can even be the same component/device, but are illustrated as separate components in FIG. 2 for clarity and brevity.

Figure 3:
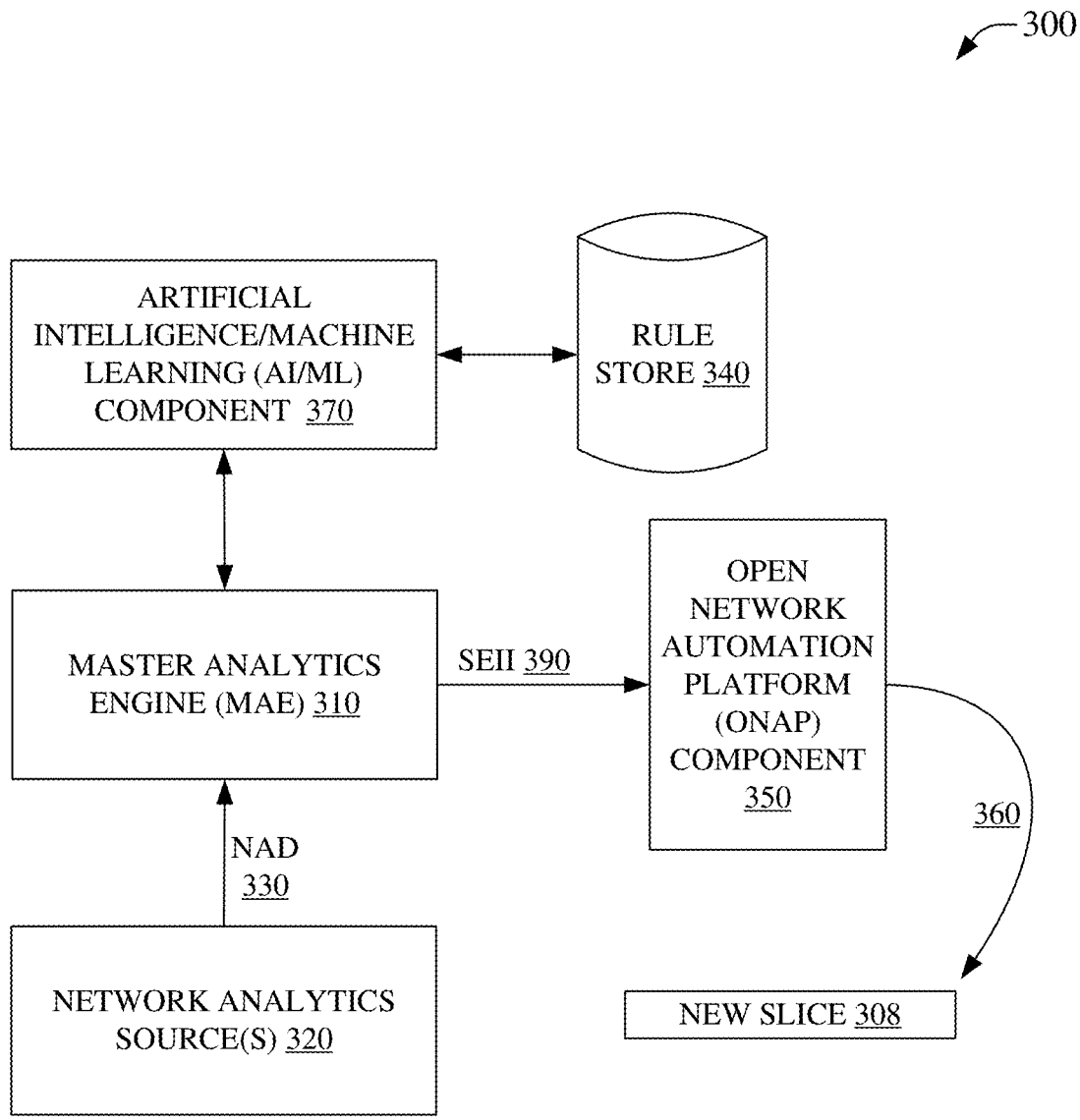
FIG. 3 is an illustration of an example system that can enable deploying a new slice via an open network automation platform (ONAP) component based on analysis of network analytic data, in accordance with aspects of the subject disclosure.

FIG. 3 is an illustration of a system 300, which can facilitate deploying a new slice via an ONAP component based on analysis of network analytic data, in accordance with aspects of the subject disclosure. System 300 can comprise MAE 310 that can receive NAD 330 from a network analytics source(s) 320. Network analytics source(s) 320 can provide analytics data from various portions of a network. Data can be collected from various data sources that illustrate where some adjustment can be made in the network slices. These data sources can correspond to different portions of the network. MAE 310 can analyze NAD 330 to enable modification of network slices.

MAE 310 can enable access to SEII 390. SEII 390 can enable modification of network slices. In some embodiments, SEII 390 can be generated by MAE 310. SEII 390 can be based on NAD 330, an inference determined via AI/ML component 370, a rule from rule store 340, etc. Modification of network slices can comprise removing a network slice, modifying a network slice, adding a network slice, etc., e.g., new slice 308 can be deployed, based on controller information 360, in response to MAE 310 facilitating access by ONAP component 350 to SEII 390.

System 300 can employ AI/ML technology to improve automation of slice modification. In an aspect, this can aid in reducing, or even eliminating, the need for human responses to changes in network performance. It is not uncommon for conventional slice technologies to send a performance alert to a user such that the user can indicate modification of slices. In an aspect, rules can be set in MAE 310 than can allow for automation of slice modification techniques. However, the addition of AI/ML technology can allow inferences to be formed or determined, for example, based on training data, monitoring of actual results of slice modifications, etc., in order to 'learn' and make improved further slice modification decisions. AI/ML component 370 can access or receive a rule via rule store 340. In some embodiments a rule can comprise training data to teach AI/ML component 370. Additionally, a rule can be employed to direct a response based on NAD 330, e.g., via AI/ML component 370, MAE 310, etc. As an example, a hospital in a dense urban environment can be using a large number of medical supplies and employ instrumentation equipment enabled by internet-of-things (IoT) type wireless communications. As supplies are consumed, as new IoT-type equipment arrives, etc., these items can be inventoried, tracked via a wireless network, etc., as an example, utilization of the IoT-type equipment in that hospital can be tracked. A network slice can facilitate the these, and other aspects, of the hospital operations.

An appropriate network slice can be created and adapted dynamically in real time, or near real time, to facilitate the hospital operations. The network slice can be based on historical data trends of the network infrastructure used by the hospital; based on new requirements that could be entered as rules, as user input, etc., a training AI/ML training set, etc. The slice being deployed can include an automation framework that can use real-time analytics and monitoring to adapt use of network resources via a network controller, e.g., ONAP, etc., based, for example, on triggers from an AI/ML engine, etc., to better meet traffic demands and targeted service needs of the hospital. In this example scenario, portions of the communications framework, e.g., RAN, transport, core, applications, virtualized functions, etc., can feed analytics data to a master analytics engine, e.g., MAE 110, 210, 310, etc. The MAE can enable design of a slice, e.g., having specific capabilities and associated metrics derived from policy driven rules, etc. The MAE can track, for example, an amount of resources utilized in the slice to perform a telehealth service, unused resources that could be shared with a different slice, etc. As such, design, creation, and/or activation of slices on a common infrastructure in a hospital information technology (IT) data center can be enhanced via the use of analysis from the MAE which automates a slice event by, for example, providing triggers to an ONAP engine to provide a template for a new slice design based on evolving service requirements. Moreover, having a closed-loop system, as described in this example, can enable tracking inventory, refill of required supplies, efficient monitoring/utilization of medical equipment via cellular IoT network, etc., and can enable the hospital to maintain a competitive edge and deliver superior patient care services. The hospital can therefore leverage the example automated slice event technology in their IT infrastructure to alter utilization of equipment, resources, etc., for example, in a more efficient manner (both locally and/or remotely) for in-house, as well as remote, diagnosis of patients. Numerous other examples are to be appreciated by one of skill in the art and all such examples are within the scope of the present disclosure despite not being enumerated for the sake of clarity and brevity.

Figure 4:
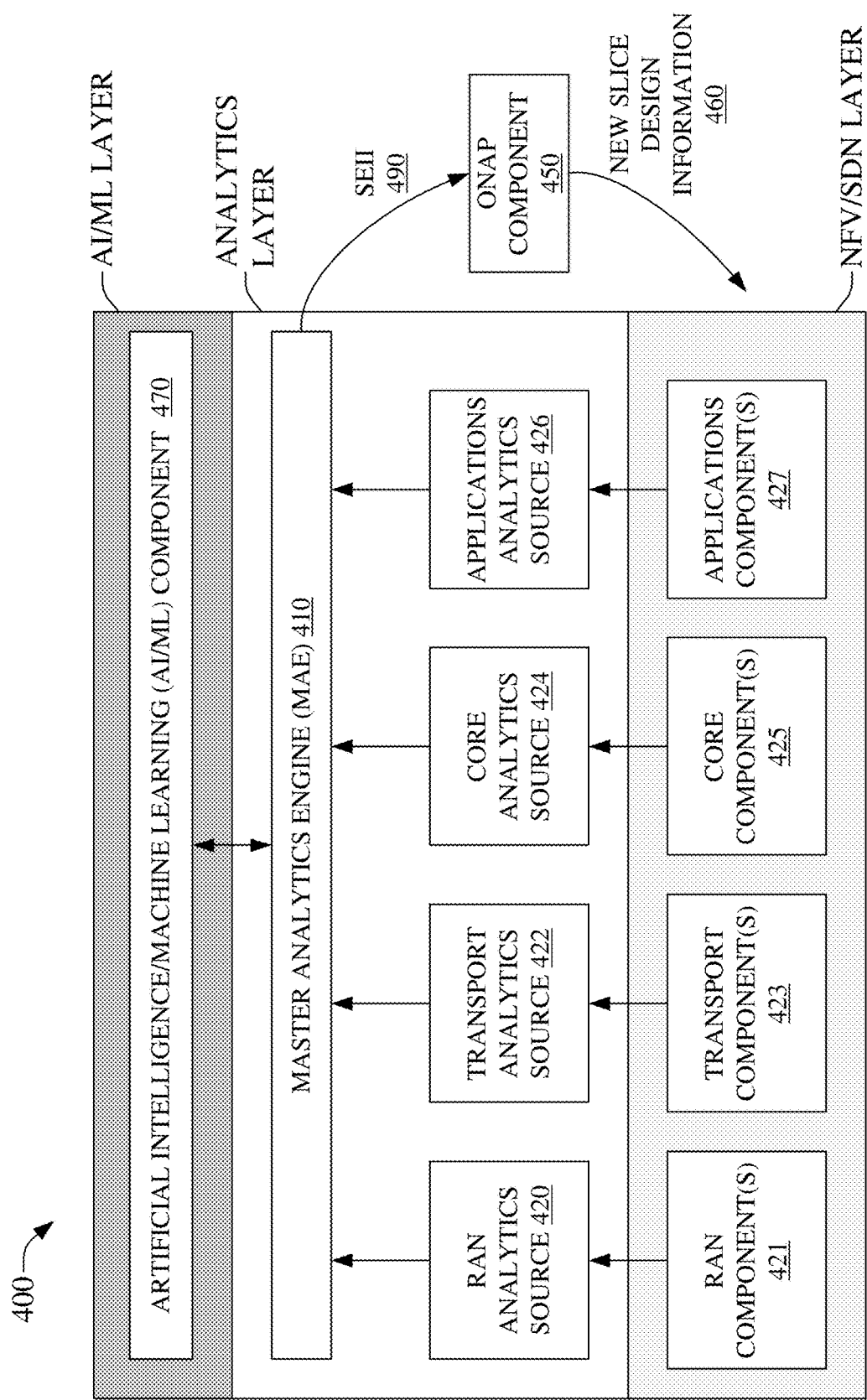
FIG. 4 illustrates an example system that can facilitate modification of network slices based on new slice design information in response to determining an inference based on coordination of network analytic data, in accordance with aspects of the subject disclosure.

FIG. 4 is an illustration of a system 400, which can enable modification of network slices based on new slice design information in response to determining an inference based on coordination of network analytic data, in accordance with aspects of the subject disclosure. System 400 can comprise MAE 410 that can receive NAD, e.g., NAD 130, 230-234, 330, etc., from a network analytics source(s), e.g., RAN analytics source 420, data transport analytics source 422, core analytics source 424, applications analytics source 426, etc. The network analytics source(s), e.g., 420-426, etc., can provide analytics data for various portions of a network, e.g., correspondingly for RAN component(s) 421, transport component(s) 423, core component(s) 425, applications component(s) 427, etc., based on data from those portions of the network. In an aspect, the various portions of the network, e.g., 421-427, etc., can be hardware, hardware and software, virtualized network functions, software deployed network components, etc. In an aspect, the various portions of the network, e.g., 421-427, etc., can exist in a network function virtualization/software deployed network (NFV/SDN) layer of the network. Data can be communicated from the various portions of the network, e.g., 421-427, etc., to the network analytics source(s), e.g., 420-426, etc., which network analytics source(s) can provide access to analytics data from the various portions of the network to MAE 410, which can then perform a coordinated analysis to of the analytics as part of determining SEII 490. Analytics data, as will be readily appreciated can comprise processed data, e.g., analytic data, related to the various portions of the network. Moreover, Analytics data can comprise raw data from various components of the various portions of the network, either alone or in combination with processed data. In an aspect, the network analytics source(s), e.g., 420-426, etc., and/or MAE 410 can be comprised in an analytics layer of the network.

System 400 can employ AI/ML technology, e. g via AI/ML component 470, etc., to improve automation of slice modification. AI/ML component 470 can enable determining an inference, e.g., an inference related to a slice event, initiation of a slice event, triggering a slice event, design of a slice, evaluation of a slice for given network analytics or given analytics for a portion of a network, ranking of a slice relative to another slice based on a characteristic of the slice, a criterion, etc., ordering of slices, filtering of slices, modification of slices, etc. The inference, in an embodiment, can be based on training of AI/ML component 470, e.g., via a training data set, etc. As will be readily appreciated by those of skill in the art, the use of AI/ML technology can readily improve the automation of slice event initiation and, in some embodiments, can enable removing or reducing human interaction in initiating a network slice event. As is previously noted, conventional slice technologies can interact with a user, such that the user can be substantially involved in modification of slices via initiation of a slice event. However, the addition of AI/ML technology can allow inferences to be formed or determined, for example, based on training data, monitoring of actual results of slice modifications, etc., in order to 'learn' and make slice modification decisions, often in lieu of a human user/operator. As such, AI/ML component 470 can communicate with MAE 410 to provide inference determining ability to sliced event initiation techniques. This inference can therefore be represented in SEII 490.

MAE 410 can enable access to SEII 490. SEII 490 can enable modification of network slices. In some embodiments, SEII 490 can be generated by MAE 410. SEII 490 can be based on NAD, e.g., from network analytics source(s), e.g., 420-426, etc., an inference determined via AI/ML component 470, a rule, e.g., from rule store 140, 340, etc., or combinations thereof. Modification of network slices can comprise removing a network slice, modifying a network slice, adding a network slice, etc. Where, for example, a new slice is to be deployed as part of a slice event, FIG. 4 illustrates access to new slice design information 460. New slice design information 460, can be accessed, for example, from ONAP component 450. ONAP component 450 can, for example, enable access to new slice design information 460 in response to receiving SEII 490 via MAE 410. As an example, a hypothetical chat application can launch a new augmented reality (AR) feature. Historically, traffic for this chat application can sustain high latency and relatively small throughput but can be considered 'bursty' in nature. Accordingly, there has historically been no special treatment for this chat application traffic and it has been relegated to being part of a general purpose network slice. However, launch of the AR feature can be very successful and the chat app with AR features might go viral. Accordingly, within a couple of days, millions of subscribers can be demanding low latency and high throughput to operate the AR feature of the chat application. The evolution of the network demands by the chat application can be captured in analytics, e.g., data regarding the latency of the service, type of traffic, location and mobility of users, throughput, etc., for various portions of the network and a MAE, e.g., MAE 410, etc., can determine that the evolving traffic pattern should be served via a new slice with more appropriate characteristics than the existing general network slice. The MAE can generate SEII, e.g., SEII 490, etc., that can cause initiation of a new dedicated slice, e.g., via an ONAP component, such as ONAP component 450, etc. The MAE can further inform, direct, instruct, etc., that UEs be directed to the new slice. In an aspect, directing the UEs to the new slice can comprise directing new UEs to the new slice, existing UEs to the new slice, or combinations thereof, e.g., existing chat app instances can be re-directed to the new slice, new chat app instances can be directed to employ the new slice, or a combination thereof.

Figure 5:
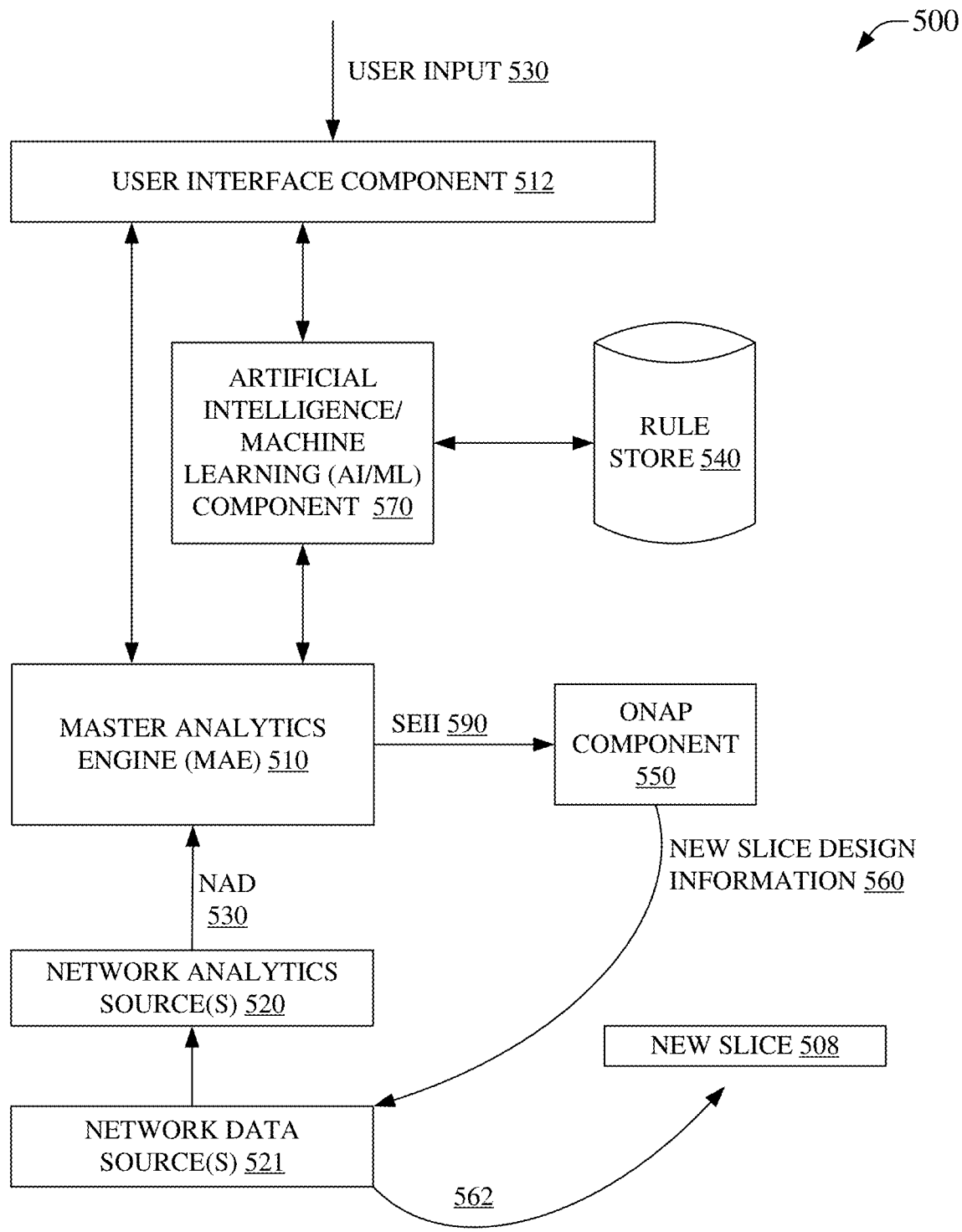
FIG. 5 illustrates an example system providing for provisioning of a new network slice based a determined inference and/or received user input, in accordance with aspects of the subject disclosure.

FIG. 5 is an illustration of a system 500, which can enable provisioning of a new network slice based on a determined inference and/or received user input, in accordance with aspects of the subject disclosure. System 500 can comprise MAE 510 that can receive NAD 530 from network analytics source(s) 520. Network analytics source(s) 520 can provide analytics data for various portions of a network, e.g., a RAN portion, a transport portion, core portion, an applications/services portion, etc., based on data from those portions of the network, e.g., from network data source(s) 521. In an aspect, network data source(s) 521 can be network hardware, network hardware and network software in combination, virtualized network functions, software deployed network components, or other real-world portions of a communications network. MAE 510 can perform an analysis of received NAD 530 as part of determining SEII 590. Analytics data, as will be readily appreciated can comprise processed data, e.g., analytic data, related to the various portions of the network. Moreover, Analytics data can comprise raw data from various components of the various portions of the network, either alone or in combination with processed data.

System 500 can comprise AI/ML component 570 that can generate an inference that can facilitate automation of network slice modification. The inference can be related, for example, to a slice event, initiation of a slice event, triggering a slice event, design of a slice, evaluation of a slice for given network analytics or given analytics for a portion of a network, ranking of a slice relative to another slice based on a characteristic of the slice, a criterion, etc., ordering of slices, filtering of slices, modification of slices, etc. In an embodiment, AI/ML component 570 can be trained based on training data, a training data set, etc. AI/ML technology can readily improve automation of slice event initiation, for example, by facilitating the removal of some or all human interaction in initiating a network slice event. As is previously noted, conventional slice technologies can interact with a user, such that the user can be substantially involved in modification of slices via initiation of a slice event. However, the addition of AI/ML technology can allow inferences to be formed or determined, for example, based on training data, monitoring of actual results of slice modifications, etc., in order to 'learn' and make slice modification decisions, often in lieu of a human user/operator. As such, AI/ML component 570 can communicate with MAE 510 to provide inference determining ability to sliced event initiation techniques. This inference can therefore be represented in SEII 590.

In an aspect, AI/ML component 570 can leverage real time, or near real time, data feeds from MAE 510 that can track a networking environment, e.g., both cross-functional and cross-layer networking characteristics, along with the trending of various service specific behaviors supported at a slice level. AI/ML component 570 can operate with a network controller, such as an ONAP component that can use an open standards framework (APIs/Procedure Calls) to drive new slice configurations and new policies into a core network function that may not have been previously available on an existing slice. AI/ML component 570 can trigger dynamic instantiation of a network slice that can provide a different end user experience by taking into account various data insights, e.g., available spectrum, resource utilization, user population, network functions needed in a targeted slice, duration etc. Moreover, AI/ML component 570 can continue to extract real time, or near real time, insight from operational characteristics of a newly deployed slice, e.g., via MAE 510. This can, in some embodiments, act as a closed-loop feedback system that can adapt service levels to contracted levels, etc. Embodiments of system 500 can dynamically adjust domain-specific design metrics by altering individual domain functions to alter operational network efficiency.

Moreover, AI/ML technology, e.g., via AI/ML component 570, can facilitate reducing the burden placed on operators by, for example, reducing a number of choices/proposed solutions for a network slice event, such that the operator can more readily chose from these 'pre-selected' slice events proposed by MAE 510 based on inference from AI/ML component 570. In embodiments of system 500, an operator, e.g., a user, etc., can provide input as user input 530 via user interface (UI) component 512. Accordingly, AI/ML component 570 can interact with MAE 510 to provide a group of slice events that can be presented to an operator. This group of slice events can already be determined to be preferable to other slice events based on an inference from AI/ML component 570. As such, embodiments of system 500 can improve existing slice deployment technologies by providing for 'pre-selection' of preferred slice event aspects. Moreover, differences between the slice events of the group presented to the operator can be highlighted to further aid the operator in selecting, e.g., via UI component 512, a slice event that can then be embodied in SEII 590 via MAE 510.

MAE 510 can enable access to SEII 590. SEII 590 can enable modification of network slices. In some embodiments, SEII 590 can be generated by MAE 510. SEII 590 can be based on NAD 530, an inference determined via AI/ML component 570, a rule from rule store 540, user input 530, etc. Modification of network slices can comprise removing a network slice, modifying a network slice, adding a network slice, etc. Where, for example, a new slice is to be deployed as part of a slice event, FIG. 5 illustrates access to new slice design information 560. New slice design information 560, can be accessed, for example, by network data source(s) 521 from ONAP component 550. ONAP component 550 can, for example, enable access to new slice design information 560 in response to receiving SEII 590 via MAE 510. Resulting new slice 508 can then be instantiated based, for example on new slice design information 560.

Figure 6:
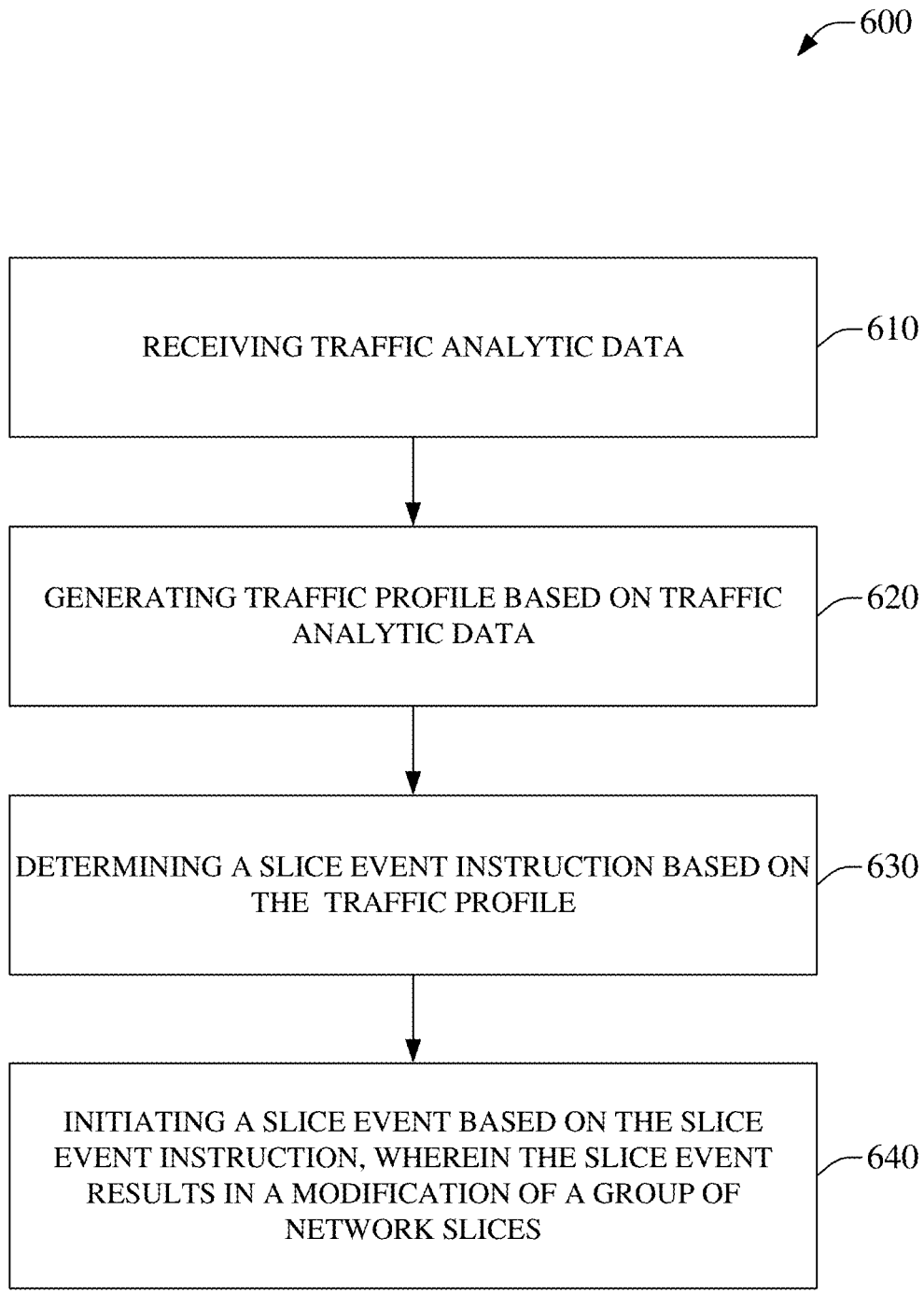
FIG. 6 is an illustration of an example method enabling initiation of a slice event for modifying a group of network slices, in accordance with aspects of the subject disclosure.
Figure 7:
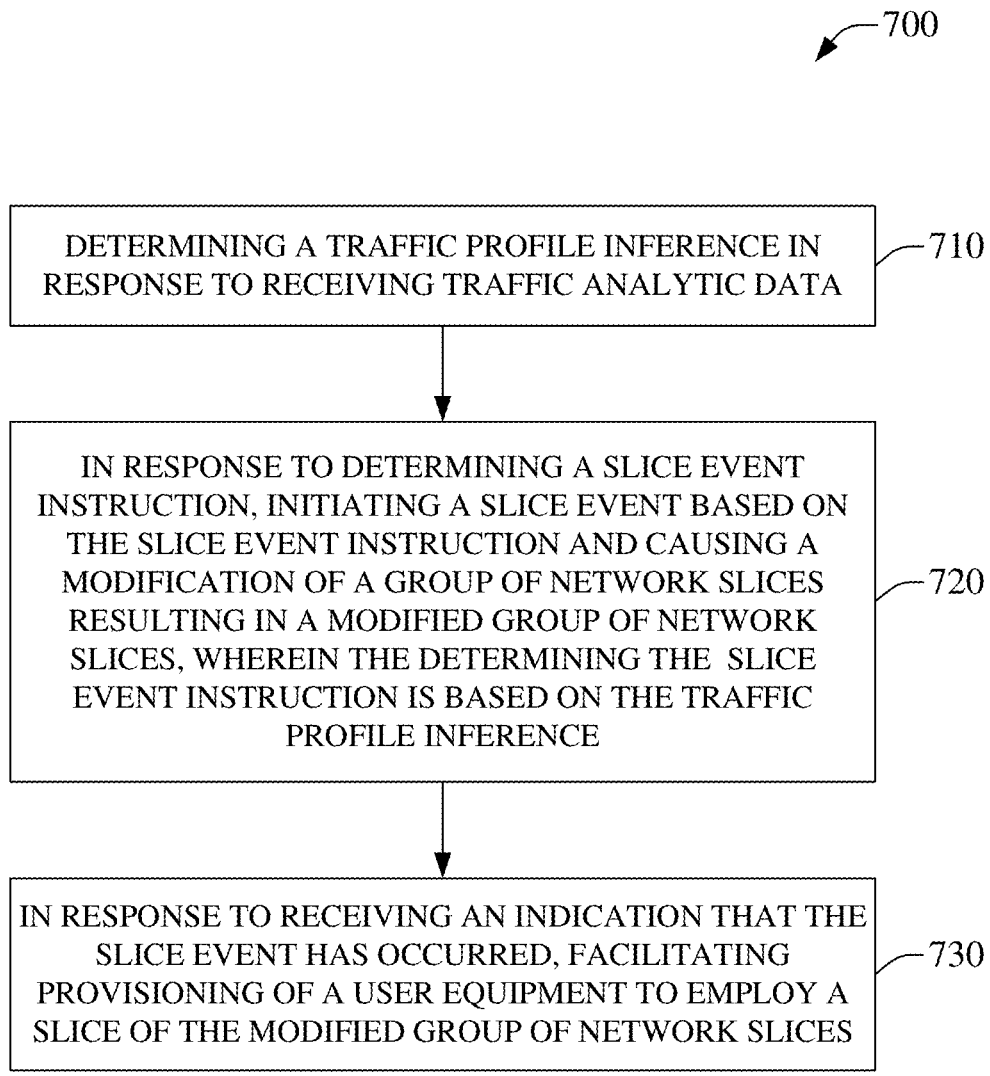
FIG. 7 illustrates an example method facilitating determining a slice event based on a traffic profile inference determined from received traffic analytic data and employing the resulting network slices, in accordance with aspects of the subject disclosure.
Figure 8:
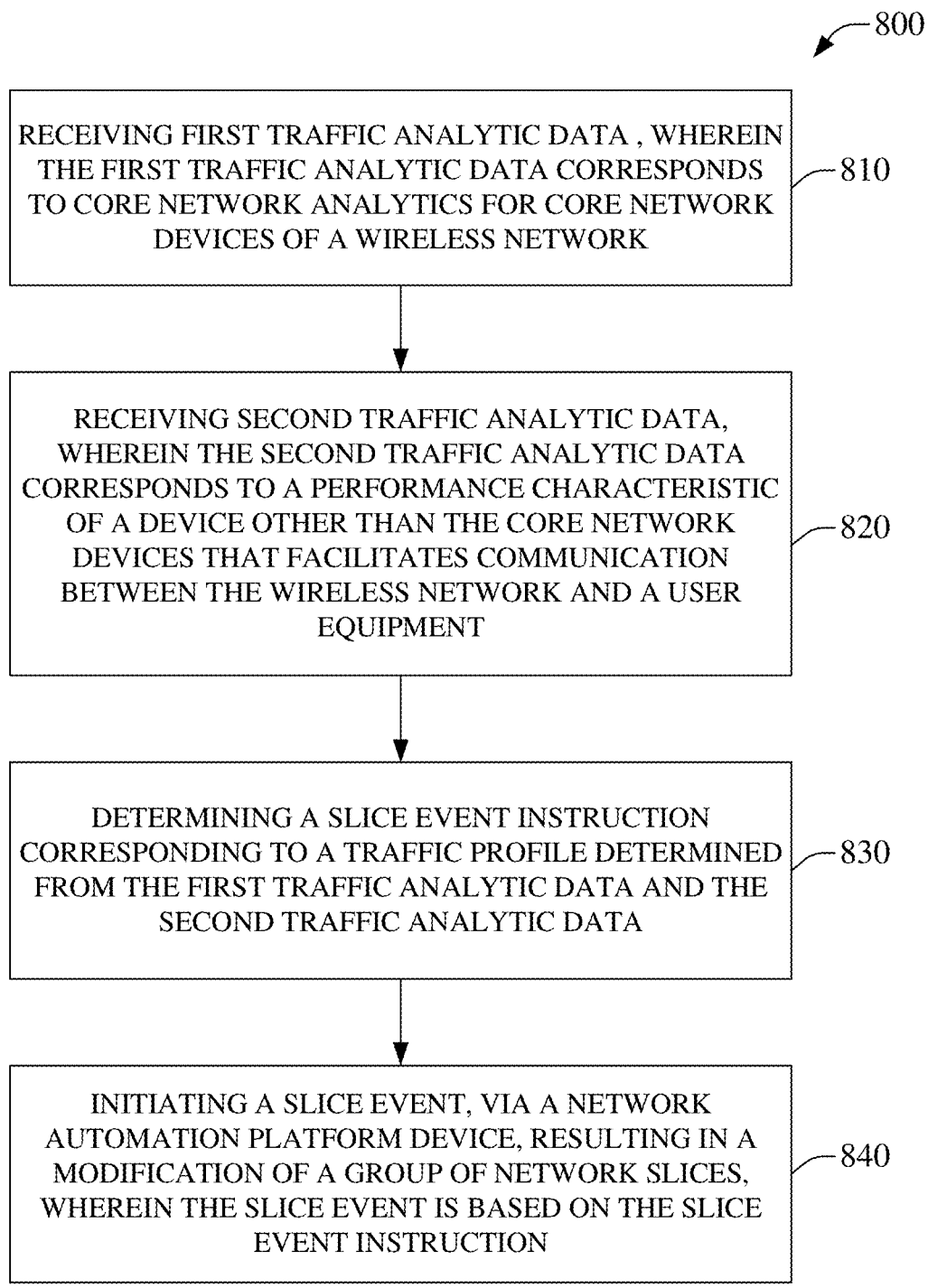
FIG. 8 illustrates an example method enabling initiating a slice event via a network automation platform device based on coordinated analysis of network analytic data from at least two network analytic data sources, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which facilitates initiating a slice event causing modification of a group of network slices, in accordance with aspects of the subject disclosure. At 610, method 600 can comprise receiving traffic analytic data. Traffic analytic data can be related to a characteristic of a portion of a communication network, such a RAN portion of a wireless communication network, a core network portion thereof, a data transport portion thereof, an application/service portion thereof, etc. In an aspect, the traffic analytic data can reflect a performance characteristic that can be altered, for example by moving traffic onto network slice of a modified group of network slices. As an example, network analytic data can indicate that a RAN network slice performance is approaching a threshold limit due to an amount of traffic employing the RAN network slice. Accordingly, deploying a new RAN network slice that is designed to accommodate more traffic can allow use of the new RAN network slice to alleviate or avoid performance degradation by continuing to use the prior RAN network slice with increased traffic. Numerous other examples are readily appreciated and are to be considered within the scope of the present disclosure despite not being enumerated for the sake of clarity and brevity. The portions of a network can comprise, among other portions, a RAN portion, a transport portion, core portion, an applications/services portion, etc. Traffic analytic data, e.g., NAD 130, 230-234, 330, etc., can be coordinated via a master analytics engine, e.g., MAE 110, 210, 310, 410, 510, etc.

At 620, method 600 can comprise, generating a traffic profile. The traffic profile can be generated by MAE, e.g., MAE 110, 210, 310, 410, 510, etc., based on the received traffic analytic data. In an aspect, the traffic profile can correspond to a performance of a network that can be leveraged to determine a slice event that can alter the performance of the network. In some embodiments, the traffic profile can be based on a rule corresponding to the coordination of the traffic analytic data, as an example, a rule can weight some traffic analytic data differently than other traffic analytic data to influence selection of a slice design that can be implemented via initiation of a slice event to alter the performance of a network via modification of network slices of the network. In some embodiments, the traffic profile can be based on inferences related to the traffic analytic data, e.g., an inference generated by an AI/ML component, such as, AI/ML component 370-570, etc.

Method 600, at 630, can comprise determining a slice event instruction based on the traffic profile. Modification of a group of slices can comprise removing a slice, adding a slice, altering a slice, etc. As such, the determining the slice event instruction can be related to adding, removing, or altering a network slice. Accordingly, a slice event can alter a group of network slices which can result in a corresponding alteration in network performance. The determining a slice event instruction can be comprised in determining a group of slice event instructions that can correspond to interactions with a network controller, such as an ONAP component, etc., that can enable causing a corresponding change in the network slices when the instruction, or group of instructions, are performed.

At 640, method 600 can comprise initiating a slice event. At this point method 600 can end. The initiating the slice event can be based on the slice event instruction determined at 630. As a result of the initiating the slice event, existing network slices can be modified, e.g., a new slice can be added to the network slices, an existing slice of the network slices can be altered or deleted, etc. The modification of the network slices can result in an altered network performance. It is noted that the slice event instruction from 630 can cause a particular modification of the network slices. As an example, the slice event instruction can generate a new slice having a determined characteristic, design, performance, etc. In this example, more than one slice event can be possible based on the traffic profile from 620, e.g., there can be more than one possible slice that can alter the network performance upon implementation and, accordingly, a preferred slice can be selected as part of determining the slice event instruction at 630 to result in initiating a preferred slice event at 640 that is at least intended to achieve a determined characteristic in network performance as a result of the slice event modifying the network slices.

In an aspect, method 600 facilities initiating a determined slice event, e.g., a slice event that is preferred, a slice event that is ranked differently than other possible slice events, a slice event that meets a slice event criterion, a slice event that passes one or more slice event filters, a slice event that meets a slice event criterion, a slice event that is determined to satisfy a slice event rule, a slice event that is determined to be in accord with a slice event inference, etc. Moreover, method 600 enables automating a slice event via use of a traffic profile that can be considerate of traffic analytic data from one or more portions of a network. A rule can be applied against the traffic profile to indicate a network slice design characteristic that is preferred, such that automation via method 600 can, for example, order, rank, sort, filter, etc., possible network slice designs to satisfy the rule allowing for determining a slice event instruction that can result in a network performance modification that is preferred over other possible network performance modification resulting from other possible slice events. Additionally, use of AI/ML techniques can further enable automation of initiating a slice event based on an inference generated based on training the AI/ML. This can reduce or eliminate the use of human operator instantiation of slices. Automation of the slice deployment in a network can be a considerable improvement in network management and design in that it can be performed at speed substantially better than would be expected with human operators, larger data sets can be considered allowing for expected improved slice design, there can be reduction/elimination of operator training, there can be lower costs, new rules/preferences can be pushed out much more quickly than would be experienced with human operator re-training, etc.

FIG. 7 illustrates example method 700 facilitating determining a slice event based on a traffic profile inference determined from received traffic analytic data and employing the resulting network slices, in accordance with aspects of the subject disclosure. Method 700, at 710, can comprise determining a traffic profile. The traffic profile can be determined in response to receiving traffic analytic data. The traffic profile can be determined by a MAE, e.g., MAE 110, 210, 310, 410, 510, etc., based on the received traffic analytic data. Traffic analytic data can be related to performance of at least a portion of a communication network. In an aspect, the performance can be altered. Traffic analytic data, e.g., NAD 130, 230-234, 330, etc., can be coordinated via a master analytics engine, e.g., MAE 110, 210, 310, 410, 510, etc.

At 720, method 700 can comprise initiating a slice event. The initiating the slice event can be in response to determining a slice event instruction. The slice event can result in, cause, trigger, etc., modification of a group of network slices, e.g., removing a slice, adding a slice, altering a slice, etc., that can result in a modified group of network slices. The determining the slice event instruction can be based on the traffic pattern profile inference, e.g., from 710. Accordingly, the determining the slice event instruction can correspond to the adding, removing, or altering of a network slice, e.g., of the group of network slices, and result in the modified group of network slices. In an aspect the modified group of network slices can perform differently, e.g., have different performance, different characteristics, different connections, etc., than the group of network slices and can result in a corresponding modification to overall network performance.

At 730, method 700 can comprise receiving an indication that the slice event has occurred and, in response, can comprise facilitating provisioning of a user equipment to employ a slice of the modified group of network slices. At this point method 700 can end. In embodiments of the disclosed subject matter, UEs can be steered onto slices of the modified group of network slices, such as from the group of network slices. As an example, where a new network slice is added, a UE using an existing slice can be directed to attach via the newly added network slice. As another example, where a new network slice is added, a UE that is newly attaching to the network can be directed to attach via the newly added network slice. Numerous other examples are readily appreciated and are to be considered within the scope of the presently disclosed subject matter despite, for the sake of clarity and brevity, not being further described.

In an aspect, method 700 facilities initiating a determined slice event and directing network traffic onto the modified group of network slices flowing from the initiating of the determined slice event. Method 700 facilitates automating initiating a slice event. Additionally, use of AI/ML techniques can further enable automation of initiating a slice event based on the traffic profile inference. The inference can be based on training of the AI/ML. Human operator instantiation and/or modification of slices can reduced or eliminated where the MAE and/or AI/ML component(s) can perform instating a slice event in a manner that will typically be fast, based on more accurate information, based on larger sets of information, based on more comprehensive rules/goals, etc. The presently disclosed automation of slice event initiation for a network can be a substantial improvement over other modern techniques.

FIG. 8 illustrates example method 800 enabling initiating a slice event via a network automation platform device based on coordinated analysis of network analytic data from at least two network analytic data sources, in accordance with aspects of the subject disclosure. Method 800, at 810, comprises receiving first traffic analytic data. The first traffic analytic data can correspond to a characteristic of a core network portion of a wireless communications network, e.g., wireless network core-network analytics. Analytic data can be determined by a network component, e.g., network analytics source(s) 120, 320, 520, etc., core network component(s) 204, core analytics source 424, or other components. The analytic data for the core network portion of the wireless network, e.g., core-network analytics, etc., can be received as first traffic analytic data.

At 820, system 800 comprises receiving second traffic analytic data that can correspond to a performance characteristic of another portion of the wireless communications network, e.g., wireless network core-network analytics, wherein the other portion is a different portion than the core network portion. The other analytic data can be determined by a corresponding network component, e.g., network analytics source(s) 120, 320, 520, etc., RAN 202, RAN analytics source 420, transport analytics source 422, applications analytics source 426, or other components. The second traffic analytic data can therefore correspond to performance of portions of the wireless network, other than the core network portion(s), that facilitate communication between a UE and the wireless network, e.g., as part of communicating with another device via a communications pathway comprising at least a portion of the wireless network.

At 830, method 800 can comprise determining a slice event instruction that corresponds to a traffic profile. The traffic profile can be determined from the first traffic analytic data and the second traffic analytic data. In embodiments, additional traffic analytic data can also be employed in determining the traffic profile. The slice event instruction can, in an embodiment, direct a slice event upon initiation of the slice event. In an embodiment, the slice event instruction can itself direct initiation of the slice event. In an embodiment, the slice instruction can also cause initiating of the slice event and the propagation of the slice event. Other embodiments are readily appreciated, all of which are within the scope of the presently disclose subject matter but are not further recited for clarity and brevity. In an aspect, the slice event instruction can be an instruction for a single action, a compound action, multiple actions, a complex action(s), a dependent action(s), a responsive action(s), etc.

At 840, method 800 can comprise initiating a slice event. At this point, method 800 can end. The slice event can be initiated via a network automation platform device. As an example an ONAP device ore component can be directed to perform actions corresponding to the slice event, e.g., the slice event can be initiated via the ONAP device or component. The initiating the slice event can be in response to the determining a slice event instruction at 830. The slice event can result in, cause, trigger, etc., modification of a group of network slices, e.g., removing a slice, adding a slice, altering a slice, etc., that can result in a modified group of network slices. In an embodiment of method 800, the initiating the slice event can be in response to receiving the slice event instruction, e.g., the slice event instruction can cause the slice event to begin. In another embodiment of method 800, the initiating the slice event can result from the slice event instruction itself, e.g., the slice event instruction being communicated can be the initiation of the slice event itself.

The slice event can cause modification of a group of network slices, e.g., adding, removing, or altering, and can result in a modified group of network slices. In an aspect the modified group of network slices can perform differently than the group of network slices before the modification resulting from the slice event.

Figure 9:
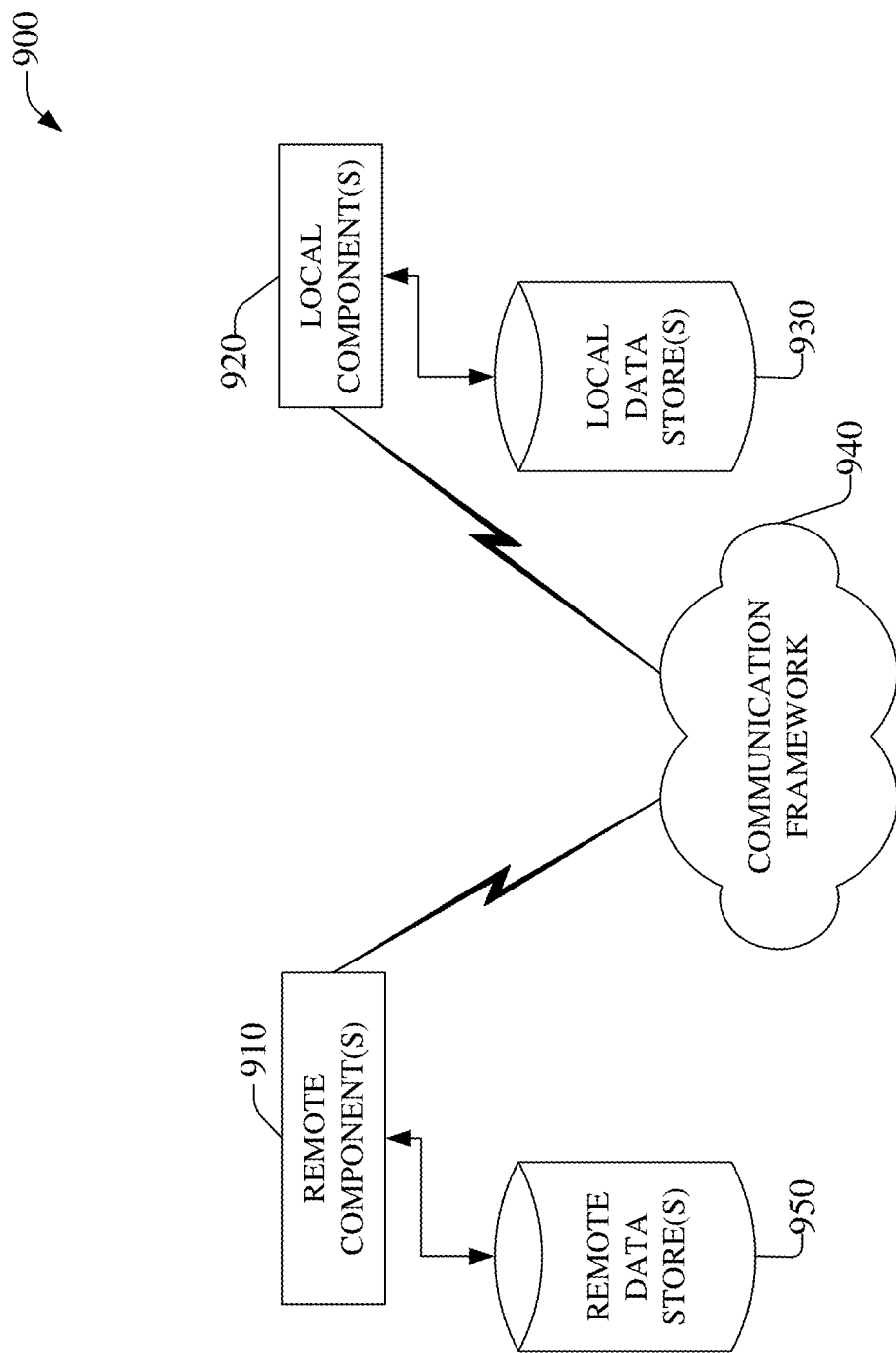
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise network analytics source(s) 120, 320, 520, etc., RAN 202, core network component(s) 204, AI/ML component 370, 470, 570 etc., RAN analytics source 420, transport analytics source 422, applications analytics source 426, UI component 512, or other component(s) or device(s) that are located remotely from MAE 110-510.

The system 900 also comprises one or more local component(s) 920. The local component(s) 920 can be hardware and/or software (e.g., threads, processes, computing devices). In some embodiments, local component(s) 920 can comprise MAE 110-510, etc., AI/ML component 370, 470, 570 etc., or other component(s) or device(s) that are located local to MAE 110-510

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, potential slice event instructions can be stored at MAE 110-510, e.g., on local data storage device(s) 930, etc., to facilitate determining SEII 190-590, etc., rules can be stored on rule store 140, 340, 540, etc., e.g., on a remote data storage device(s) 950, etc.

Figure 10:
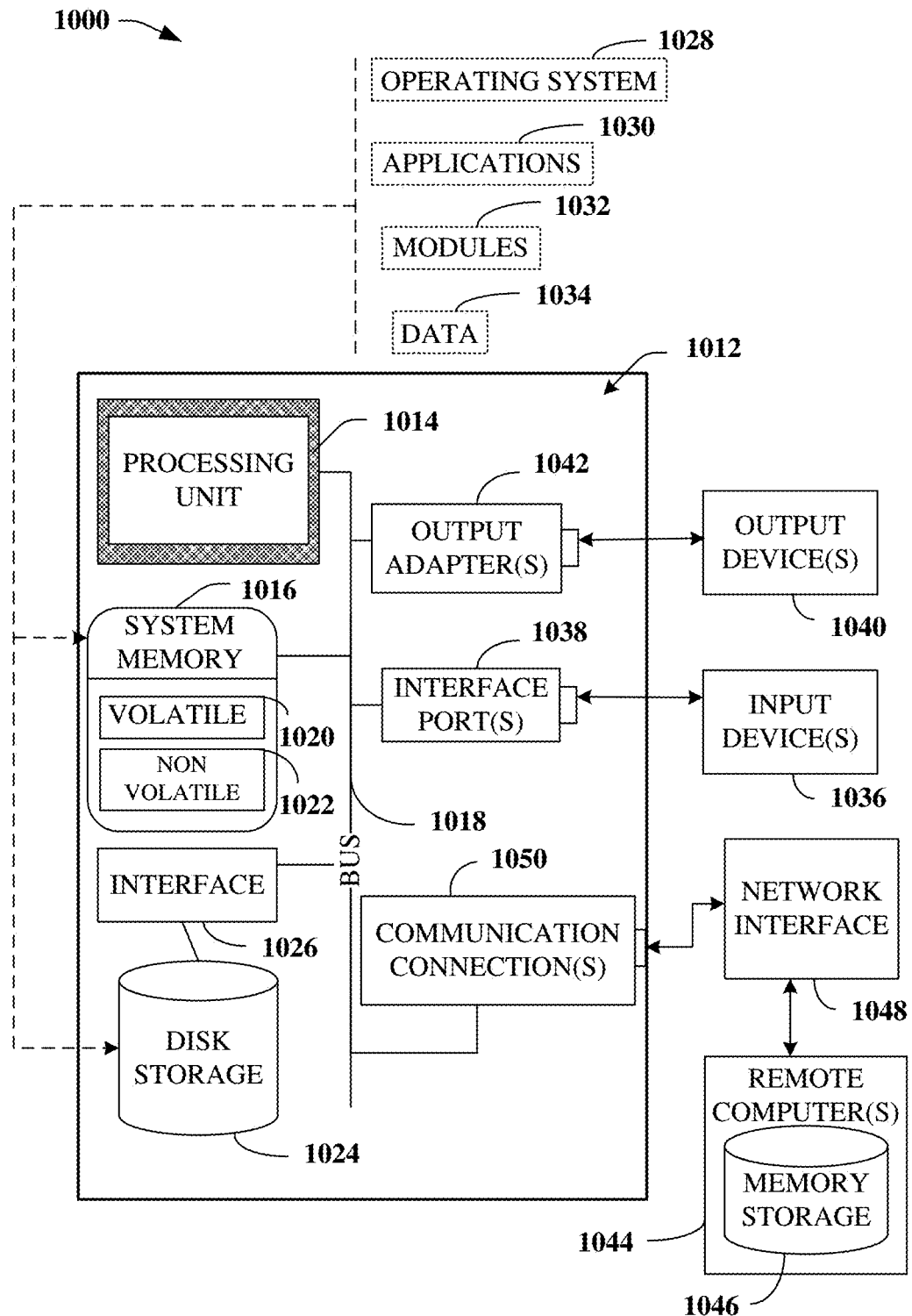
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in MAE 110-510, etc., network analytics source(s) 120, 320, 520, etc., RAN 202, core network component(s) 204, AI/ML component 370, 470, 570 etc., RAN analytics source 420, transport analytics source 422, applications analytics source 426, UI component 512, etc., network controller 250, ONAP component 350, 450, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising initiating a slice event based on a slice event instruction corresponding to analysis of network analytics for various portions of a network, and can be based on rules and/or inferences related to the analysis of the network analytics.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
    a processor; and
    a memory that stores executable instructions that, when executed by the processor, facilitate performance of operations, comprising:
      receiving first network state information corresponding to a first state of a portion of a network, wherein the portion of the network comprises network devices enabling first communication between a first user equipment and a first device via the network devices;
      determining a first network slice of possible network slices implementable by the network devices to facilitate the first communication between the first user equipment and the first device via the network, wherein the determining the first network slice is based on the first network state information, and wherein the network slice comprises a radio access network slice and a core network slice;
      selecting the first network slice from the possible network slices based on the first network slice satisfying a performance rule related to a defined performance of the first network slice; and in response to the selecting the first network slice, initiating deployment of the first network slice to enable the first communication between the first user equipment and the first device via the first network slice.

2. The device of claim 1, wherein the selecting the first network slice from among the possible network slices is further based on an ordering of the possible network slices, and wherein the ordering of the possible network slices relates to relative performances of the possible network slices.

3. The device of claim 2, wherein the ordering of the possible network slices is a rank ordering of the possible network slices based on ranks representative of the relative performances.

4. The device of claim 1, wherein the initiating the deployment of the first network slice comprises initiating an adaptation to a parameter of a second network slice that already facilitates the first communication between the first user equipment and the first device.

5. The device of claim 1, wherein the initiating the deployment of the first network slice comprises generating the first network slice and causing the first communication between the first user equipment and the first device to occur via the first network slice.

6. The device of claim 5, wherein the causing the first communication between the first user equipment and the first device to occur via the first network slice comprises causing an existing communication between the first user equipment and the first device via a second network slice to cease.

7. The device of claim 5, wherein the causing the first communication between the first user equipment and the first device to occur via the first network slice comprises causing an existing communication between the first user equipment and the first device via a second network slice to continue.

8. The device of claim 1, wherein the defined performance of the first network slice is a first defined performance, wherein the deployment of the first network slice is a first deployment, and wherein the operations further comprise:
receiving second network state information corresponding to a second state of the portion of the network comprising the network devices enabling the first communication between the first user equipment and the first device via the network;
selecting a second network slice from the possible network slices based on the second network slice satisfying the performance rule related to a second defined performance of the second network slice; and
in response to the selecting the second network slice, initiating a second deployment of the second network slice to enable a second communication between a second user equipment and a second device to occur via the second network slice.

9. The device of claim 1, wherein the deployment of the first network slice is a first deployment, and wherein the operations further comprise:
in response to the selecting the first network slice, initiating a second deployment of the first network slice to enable a second communication between a second user equipment and a second device via the first network slice.

10. The device of claim 9, wherein the first device is a different device than the second device.

11. The device of claim 1, wherein the determining the first network slice comprises determining a first performance metric based on an inference formed from trending network infrastructure use data comprised in the first network state information.

12. The device of claim 1, wherein the determining the first network slice comprises determining a first performance metric based on an inference formed from available services data comprised in the first network state information.

13. The device of claim 1, wherein the determining the first network slice comprises determining a first performance metric based on an inference formed from historical network traffic demand data comprised in the first network state information.

14. The device of claim 1, wherein the initiating the deployment of the first network slice comprises triggering an open network automation platform engine to provide a design template for the first network slice.

15. A method, comprising:
determining, by a system comprising a processor and a memory, a network slice event instruction corresponding to a possible network slice of possible network slices implementable by network devices of a wireless network to facilitate communication between a user equipment and a device via a portion of the wireless network, wherein the determining the network slice event instruction is based on an analysis of analytic data corresponding to at least a portion of the wireless network, and wherein the possible network slices comprise combinations of radio access network slices and core network slices; and
initiating, by the system, a network slice event based on the network slice event instruction, wherein the network slice event results in modification of a group of network slices of the wireless network.

16. The method of claim 15, wherein the initiating the network slice event results in the modification of the group of network slices comprising adding a new network slice to the group of network slices of the wireless network.

17. The method of claim 15, wherein the initiating the network slice event results in the modification of the group of network slices comprising removing an existing network slice from the group of network slices of the wireless network.

18. The method of claim 15, wherein the determining the network slice event instruction is based on an inference related to the analytic data corresponding to at least a first portion of the wireless network.

19. A non-transitory machine-readable storage medium, comprising executable instructions that, when executed by a processor, facilitate performance of operations, comprising:
determining a network slice event instruction corresponding to a possible network slice of possible network slices implementable by network devices of a network to facilitate communication between a user equipment and a device via a portion of the network, wherein the determining the network slice event instruction is based on a first analysis of first analytic data corresponding to a first portion of the network, and wherein the possible network slice comprises a selected radio access network slice and a selected core network slice; and
facilitating progression of a network slice event based on the network slice event instruction, wherein the network slice event results in modification of a group of network slices of the network.

20. The non-transitory machine-readable storage medium of claim 19, wherein the first portion of the network is a core-network portion of the network comprising core-network devices, wherein the determining the network slice event instruction is further based on a second analysis of second analytic data corresponding to a second portion of the network, and wherein the second portion of the network is other than the core-networks portion of the network.

* * * * *